United States Patent [19]

Saitoh

[11] Patent Number: 4,809,180
[45] Date of Patent: Feb. 28, 1989

[54] SEAT CONTROL APPARATUS FOR VEHICLE

[75] Inventor: Masatsugu Saitoh, Ayase, Japan

[73] Assignee: Ikeda Bussan Co., Ltd., Ayase, Japan

[21] Appl. No.: 40,900

[22] Filed: Apr. 21, 1987

[30] Foreign Application Priority Data

Apr. 22, 1986 [JP] Japan .................................. 61-91179

[51] Int. Cl.⁴ ......................... B60N 1/02; G06F 15/20
[52] U.S. Cl. ............................... 364/424.05; 318/466; 296/65 R
[58] Field of Search ............... 364/424, 715, 425, 706, 364/565; 297/311, 346; 318/466, 467, 468, 470, 765; 340/64; 296/63, 64, 65 R, 65 A, 66, 67, 68, 69

[56] References Cited

U.S. PATENT DOCUMENTS

| | | | |
|---|---|---|---|
| 3,256,033 | 6/1966 | Adams et al. | 318/467 X |
| 4,005,845 | 2/1977 | Luppi et al. | 297/346 X |
| 4,155,587 | 5/1979 | Mitchell | 297/346 X |
| 4,404,632 | 9/1983 | Harada et al. | 296/65 R X |
| 4,451,887 | 5/1984 | Harada et al. | 364/424 |
| 4,463,426 | 7/1984 | Cadick et al. | 364/424 |
| 4,467,426 | 8/1984 | Hida et al. | 364/424 |
| 4,580,837 | 4/1986 | Bayly | 297/346 X |
| 4,607,199 | 8/1986 | Krueger et al. | 364/424 X |
| 4,698,571 | 10/1987 | Mizuta et al. | 318/466 X |
| 4,707,788 | 11/1987 | Tashimo et al. | 318/466 X |

Primary Examiner—Gary Chin
Attorney, Agent, or Firm—Foley & Lardner, Schwartz, Jeffery, Schwaab, Mack, Blumenthal & Evans

[57] ABSTRACT

A seat control apparatus for adjusting a seat mounted on a vehicle by moving various parts constituting the seat comprises a switch provided on the vehicle for detecting whether a door positioned adjacent to the seat is opened or closed and a controller for producing control signals in dependence on the output of the switch. When an opened state of the door is detected, control for rotating the seat is allowed. Upon detection of the closed state of the door, the control for rotating the seat is inhibited.

5 Claims, 3 Drawing Sheets

FIG. I

SEAT CONTROL APPARATUS FOR VEHICLE

BACKGROUND OF THE INVENTION

1. Field of the Invention

The present invention relates to a seat control apparatus for adjusting a seat of a vehicle such as a car by moving various parts constituting the seat.

2. Description of the Prior Art

As one of the features of seats for the vehicle, there has been known a so-called microcomputer-controlled seat in which adjustment of forward or backward positions of the seat (i.e. the positions of the seat in the direction longitudinal of the car), the angle of reclining the back of the seat, height of the seat or the head rest, the extent of protrusions of the thigh support, side supports and the lumbar support, can be electrically controlled.

In such microcomputer-controlled seat, when any one of plural switches installed at a side or arm support of the seat is pushed, this is detected by a microcomputer provided in association with the seat, whereby the part or portion of the seat such as, for example, the seat slide mechanism, the reclining back adjusting device, or the like, is actuated to adjust the forward/backward (longitudinal) position of the seat, the angle of the reclining back.

Among the hitherto known seats of the type mentioned above, there is also known a seat which can be rotated or turned in a substantially horizontal plane for facilitating getting on and/or getting off the car. This kind of seat suffers a drawback in that an inadvertent switch manipulation of the car driver or passenger will cause the seat to be moved in an undesirable direction.

SUMMARY OF THE INVENTION

In light of the state of the prior art, it is an object of the present invention to provide a seat control apparatus for preventing a seat from being rotated under certain conditions such as the closed state of a door positioned adjacent to the seat regardless of inadvertent manipulation of an associated switch.

In view of the object mentioned above, there is provided according to an aspect of the present invention a seat control apparatus for a vehicle which comprises an opened/closed door state detecting switch for detecting an opened or closed state of a door, a controller for allowing a seat to be rotated or inhibiting the seat from rotation on the basis of a result of the detection of the opened/closed door state detecting switch, a first actuating member for causing the seat to be rotated in accordance with a seat rotation control signal produced by the controller, and second actuating members for allowing other seat operations exclusive of the rotation of the seat in response to a seat rotation inhibit signal produced by the controller.

With the arrangement of the seat control apparatus described above, the seat rotating operation is controlled when the opened state of door is detected by the opened/closed door state detecting switch, while seat operations other than the rotation of seat are controlled upon detection of the closed door state.

In other words, the seat rotating operation is allowed to be controlled only when door is opened as detected by the opened/closed door state detecting switch. Thus, the movement of the seat in the undesired or unwanted direction is positively prevented even when a driver or passenger should push inadvertently the seat rotating switch in the course of operation of the vehicle, whereby the position of the motor-actuated seat can be assured.

The above and other objects, novel features and advantages of the present invention will be better understood from the following description of the preferred embodiments of the invention taken in conjunction with the accompanying drawings.

DESCRIPTION OF THE PREFERRED EMBODIMENTS

Figure 1:
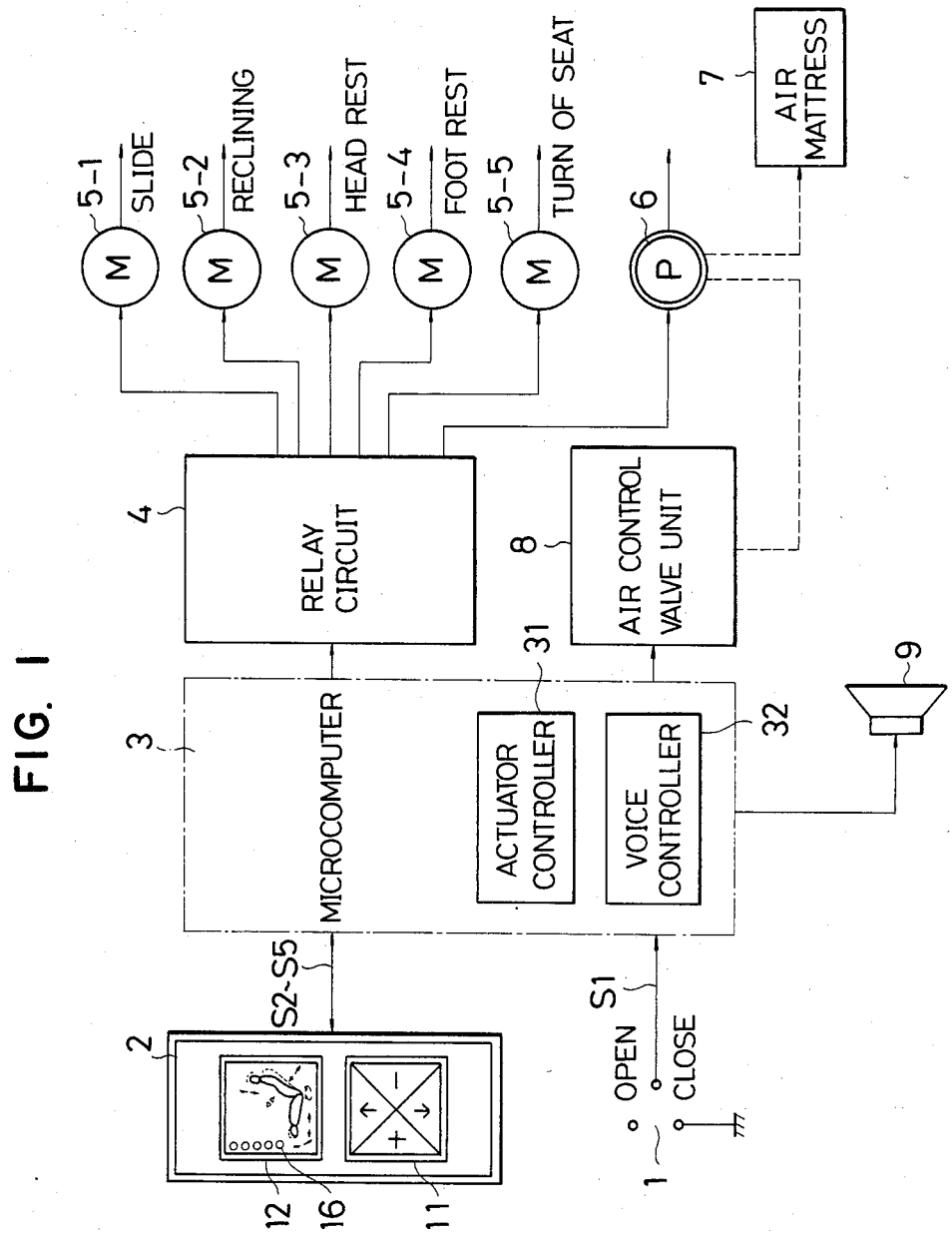
FIG. 1 is a block diagram showing a general arrangement of the seat control apparatus according to an exemplary embodiment of the present invention.

Now, the present invention will be described in detail in connection with an exemplary embodiment thereof by referring to the drawings.

FIG. 1 shows in a circuit block diagram a general arrangement of a seat control apparatus according to an exemplary embodiment of the present invention.

The circuit arrangement shown in FIG. 1 is made such that the rotation of a seat provided with the seat control apparatus can be performed only when a door located adjacent to the seat under consideration is opened while inhibiting the seat from rotation when the door is closed and permitting other adjustments such as adjustment of the forward/backward (longitudinal) position of the seat, adjustment of the angle of the reclining seat back, adjustment of height level of a head rest, adjustment of the configuration of a lumbar support and adjustment of the angular position of a foot rest. To this end, the seat control circuit includes an opened/closed door state detecting switch 1, a manipulating switch and display unit 2, a microcomputer 3, a relay circuit 4, an electric motor serving as a first actuating member, electric motors 5-1 to 5-4 and a pump 6 which constitute second actuating members, an air-mattress 7, an air control valve unit 8 and a speaker 9.

The opened/closed door state detecting switch 1 is provided in the door and adapted to produce a closed door state signal (ground potential signal) S1 when the door is closed, which signal is supplied to the microcomputer 3.

Figure 3:
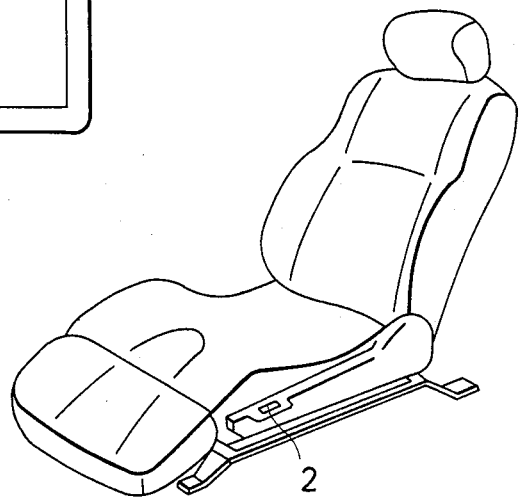
FIG. 3 is a schematic view of a seat for illustrating installation of a seat manipulating/display unit.

The manipulating switch and display unit 2 may be installed at a seat side portion (arm rest portion), as is shown in FIG. 3, and includes a manipulating switch field 11 and a display field 12.

Figure 2:
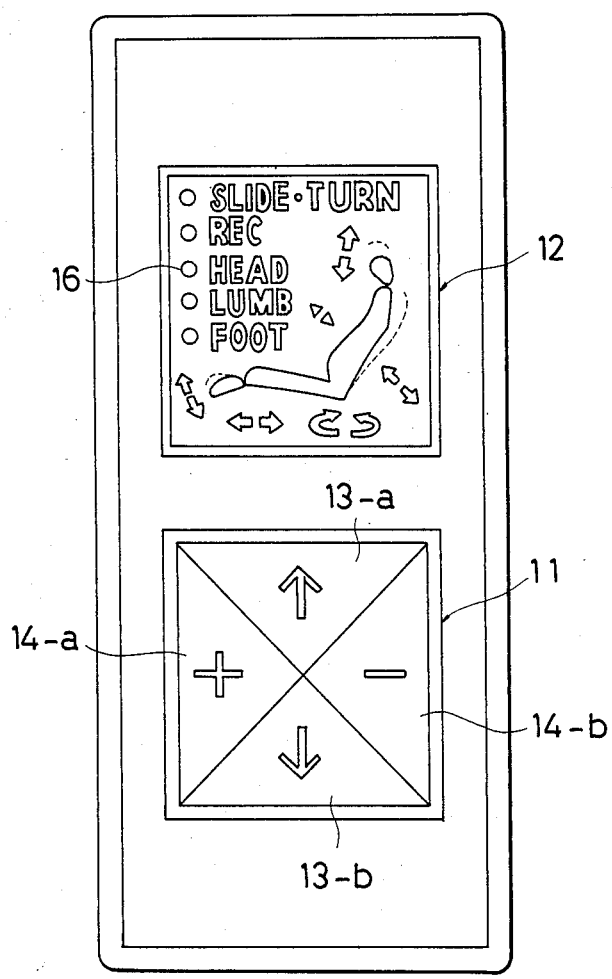
FIG. 2 is an enlarged top plan view of a seat manipulating unit shown in FIG. 1.

Referring to FIG. 2 showing the manipulating switch and display unit 2 in more detail, a manipulating switch 11 is implemented in a key switch having a key top which can be selectively actuated in four directions i.e. in the directions toward a forward movement area 13-a, a backward movement area 13-b, an increasing area 14-a and a decreasing area 14-b. When the forward movement area 13-a is pushed by a finger, the manipulating switch 11 is inclined in the corresponding direction to cause the manipulating switch and display unit 2 to produce a forward movement command signal S2. Subsequently, upon releasing of the finger from the forward movement area 13-a, the manipulating switch 11 is restored to the original position (neutral position). Similarly, when any one of the backward movement area 13-b, the increasing area 14-a and the decreasing area 14-b is pressed, the manipulating switch 11 is inclined in the corresponding direction, whereupon the manipulating switch and display unit 2 produces correspondingly a backward movement command signal S3, an increasing command signal S4 or a decreasing command signal S5. Each of these signals S2-S5 are supplied to the microcomputer 3.

The display field 12 has a display screen divided into an animated or simulated seat state display area and an adjustment item display area for displaying the portion to be adjusted. The displays on both of these areas can be varied in dependence on display command signals supplied from the microcomputer.

More specifically, the adjustment item display area is adapted to display "SLIDE" indicating the forward-/backward position of the seat, "REC" indicating angular adjustment of the seat, "HEAD" indicating height adjustment of the head rest, "LUMB" indicating adjustment of the lumbar support, "FOOT" indicating adjustment of the angular position of the foot rest, or "TURN" indicating rotation of the seat.

The microcomputer 3 includes a microprocessor, a ROM (read-only memory), a RAM (random access memory), an actuator controller 31 and a voice controller 32.

In the state in which the closed door detection signal S1 is supplied, the actuator controller 31 responds to the forward or backward movement signal S2 or S3 to select, among the second actuating members, the motor 5-1 for adjusting the position of the seat, the motor 5-2 for adjusting the angle of the reclining back, the motor 5-3 for adjusting the height of the head rest, the motor 5-4 for adjusting the angular position of the foot rest or the lumbar support adjusting pump 6 connected to the air control valve unit 8 through the relay circuit 4, which controls the quantity of adjustment so as to be optimum in response to the increasing or decreasing command signal S4 or S5. By way of example, the quantity of air supplied to the air mattress 7 incorporated in the seat from the pump 6 can be controlled in this way, whereby the extent of protrusion of the lumbar support can be adjusted correspondingly. In the state in which the closed door detection signal S1 is not supplied, i.e. when the door is opened, the seat rotating motor 5-5 which constitutes the first actuating member is selected, whereby the state ready for seat rotation is established. When the increasing command signal S4 is produced, the motor 5-5 rotates or turns the seat from the position where the seat is oriented in the face of the handle to a position facing toward the door. On the other hand, in response to the decreasing command signal 35, the motor 5-5 operates so as to rotate the seat from the position facing the door to the orientation facing toward the handle. At that time, the voice controller 32 is turned on in response to either one of the increasing or decreasing command signals S4 or S5 to cause the speaker 9 to produce voice information of the direction in which the seat is to be rotated in precedence to the actual rotation of the seat.

Figure 4:
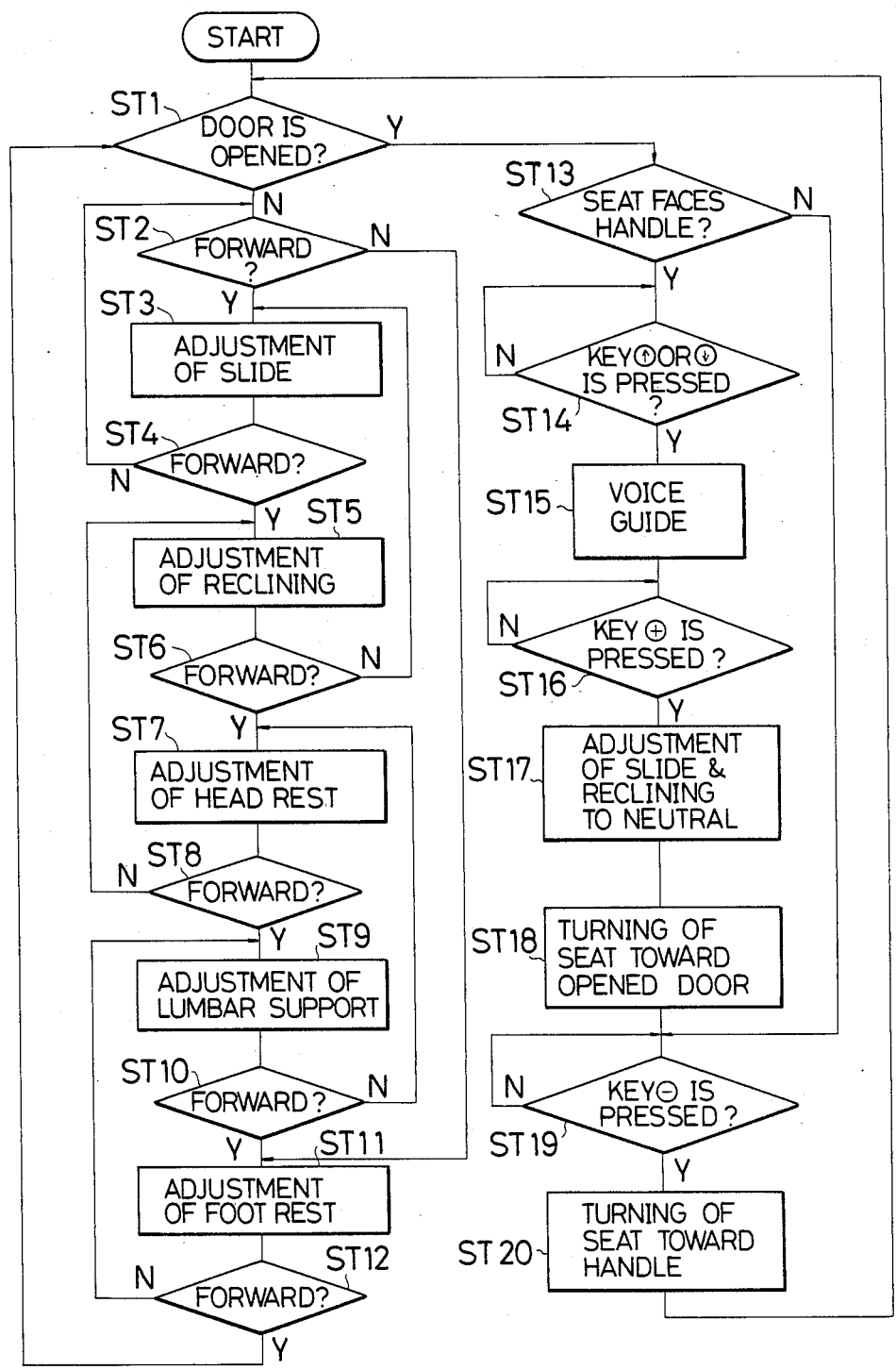
FIG. 4 is a view showing a flow chart for illustrating operation of the seat control apparatus.

Next, the operations outlined above will be described in detail by referring to a flow chart shown in FIG. 4.

At a step ST1, the microcomputer 3 checks the closed or opened state of the door on the basis of the output signal produced by the opened/closed door state detection switch 1. Upon detection of the closed door state detection signal S1, the microcomputer 3 displays the types of adjustments of the seat on the display field 12. When the forward movement area 13-a or the backward movement area 13b of the manipulating switch 11 is pressed, the forward movement command signal S2 or the backward movement command signal S3 is generated, whereby the cursor 16 is sequentially moved forwardly from "SLIDE" to "FOOT" or backwardly in the opposite direction. At steps ST2 to ST12, microcomputer 3 discriminatingly identifies the control mode in accordance with the forward movement command signal S2 or the backward movement command signal to thereby set one of the motors 5-1 to 5-4 and the pump 6 to the state ready for operation by enabling the associated drive circuit through the relay circuit 4 and the air control valve unit 8. Further, the microcomputer 3 responds to the increasing command signal S4 or decreasing command signal S5 produced by pushing the increasing or decreasing area 14-a or 14-b of the manipulating switch 11 to thereby cause one of the motors 5-1 to 5-4 or the pump 6 to be actuated to thereby displace the seat correspondingly. The magnitude of the displacement is detected by an associated sensor provided in the corresponding part of the seat. The microcomputer 3 arithmetically determines changes in the seat configuration on the basis of the displacement, the result of which is correspondingly reflected in the picture produced on the display field 12.

Unless the closed door state signal S1 is detected at the step ST1, the microcomputer 3 positions the cursor 16 fixedly at the location "TURN" on the display field 12 to inform the operator that the manipulation of the seat is possible only in connection with the rotation thereof. Subsequently, the microcomputer 3 checks at a step ST13 as to whether the seat is oriented in the direction toward the handle. Unless the seat is oriented in that direction, the microcomputer 3 inhibits the seat from rotation in the direction toward the opened door. In that case, the rotating motor 5-5 can be operated only in response to the decreasing command signal S5 produced by pressing the decreasing area 14-b of the switch 11 to thereby rotate the seat to the position in the direction toward the handle (step ST19, ST20). On the other hand, when it is decided at the step ST13 that the seat is oriented toward the handle, the microcomputer 3 causes the voice controller 11 to be actuated in response to the operation of the forward or backward movement area 13-a or 13-b (steps ST14 and ST15). The voice controller 31 may previously store therein voice messages such as, for example, "SEAT CAN BE TURNED" and "PLEASE PRESS PLUS SWITCH" (increasing area 14-a) to produce voice guide information through the speaker 9 to excite the attention of the operator. When the increasing area 14-a of the switch 11 is pressed (step ST16), the microcomputer 3 drives the forward/backward seat position adjusting motor 5-1 and the reclining angle adjusting motor 5-2 through the actuator controller 31 and the relay circuit 4 to thereby set the seat and the reclining back to the respective neutral positions (step ST17), which is so selected that no obstacle is presented to the rotation of the seat and can be previously stored in the microcomputer 3 after having been determined in consideration of relationships between the intra-car available space and the seat and other parameters. Subsequently, the microcomputer 3 drives the foot-rest angle adjusting motor 5-4 and the seat rotating motor 5-5 for causing the foot rest to be folded downwardly so as to facilitate the operator in leaving the seat while causing the seat to be rotated from the direction facing the handle to the position facing the opened door (step ST13). As the result of the rotation of the seat, the driver or passenger can smoothly get out of the car with one step. When it is desired to rotate the seat back to the direction toward the handle before closing the door, the decreasing area 14-b of the switch 11 may be pressed. Then, the seat rotating motor 5-5 is again driven in such a direction to reset the seat to the original position oriented in the direction facing toward the handle (steps ST19 and ST20). Unless the seat is oriented toward the door aperture upon getting on the car, the aforementioned steps ST13 and ST20 are executed, whereby smooth and comfortable occupation of the seat can be assured.

As will be appreciated from the foregoing description, the seat rotation control is inhibited by providing the opened/closed door state detecting switch 1, whereby danger of the seat being rotated in the door closed state can be positively excluded. Further, since the rotation of the seat is clearly messaged beforehand through the voice controller 32 and the speaker 9 in addition to the picture produced on the display field 12 while the seat is adjusted to the neutral state in precedence to the rotation of the seat, the seat can be rotated efficiently and smoothly. Besides, the manipulating unit including the switch 11 having the forward/backward movement area 13-a and 13-b for selectively actuating the motors 5-1 to 5-5 and the pump 6 as well as the increasing and decreasing areas 14-a and 14-b for regulating the quantities or magnitude of control is realized in a compact structure without requiring any significant space for installation, whereby a great freedom can be assured in designing the seat equipped with the control apparatus of this type.

Although the invention has been described in conjunction with the illustrated embodiment, it should be appreciated that numerous modifications and changes will readily occur to those skilled in the art without departing from the spirit and scope of the invention.

What is claimed is:

1. A seat control apparatus for controlling various seat moving operations in a vehicle, comprising:
   an opened/closed door state detecting switch for detectng an opened or closed door state;
   a controller for allowng a seat to be rotated and inhibiting said seat from being rotated based on the detection of said opened/closed door state detecting switch;
   a manipulating switch included in a key switch which is selectively actuated in a plurality mode for inputting corresponding command signals into said controller;
   a first actuating member for causing said seat to be rotated in accordance with a seat rotation control signal produced by said controller;
   at least a second actuating member for allowing seat moving operations exclusive of the rotation of said seat in response to a seat rotation inhibit signal produced by said controller wherein the key switch is used for rotating the seat when the open/closed door state detecting switch detects the open door state, and for performing other seat operations exclusive of the rotation of the seat when the open/closed door state detecting switch detects the closed door state.

2. A seat control apparatus according to claim 1, wherein said seat rotation control signal is generated based on an opened door state detecting signal produced by said opened/closed door state detecting switch.

3. A seat control apparatus according to claim 1, wherein said seat rotation inhibiting control signal is generated based on a closed door state detection signal produced by said opened/closed door state detecting switch.

4. A seat control apparatus according to claim 1, including a display means for generating a simulated state of the seat and locations to be adjusted.

5. A seat control apparatus according to claim 4, wherein said display means is connected to said controller and includes a second manipulating switch and a display field.

* * * * *